US005609363A

United States Patent [19]
Finelli

[11] Patent Number: 5,609,363
[45] Date of Patent: Mar. 11, 1997

[54] PASSENGER SIDE AIR BAG WITH TETHER

[75] Inventor: Thomas A. Finelli, Ypsilanti, Mich.

[73] Assignee: Chrysler Corporation, Auburn Hills, Mich.

[21] Appl. No.: 559,898

[22] Filed: Nov. 17, 1995

[51] Int. Cl.⁶ .................................................. B60R 21/16
[52] U.S. Cl. ...................... 280/743.2; 280/732; 280/730.1
[58] Field of Search ................................ 280/730.1, 732, 280/743.2

[56] References Cited

U.S. PATENT DOCUMENTS

| 4,262,931 | 4/1981 | Strasser et al. | 280/730.1 |
| 5,205,584 | 4/1993 | Honda | 280/743.2 |
| 5,310,214 | 5/1994 | Cuevas | 280/743.2 |
| 5,364,124 | 11/1994 | Donegan et al. | 280/730.1 |
| 5,380,038 | 1/1995 | Hawthorn et al. | 280/743.2 |

Primary Examiner—Kenneth R. Rice
Attorney, Agent, or Firm—Edward A. Craig

[57] ABSTRACT

An air bag having a main sac portion and a lateral extension of the main sac portion, which together provide a broad cushion to protect the right front occupant and the center occupant of the front seat of an automotive vehicle. An external tether is attached to the lateral extension to restrict air bag rotation, when the air bag is inflated.

5 Claims, 3 Drawing Sheets

PASSENGER SIDE AIR BAG WITH TETHER

FIELD OF INVENTION

This invention relates generally to air bag assemblies for automotive vehicles and more particularly to a tethered passenger side air bag.

BACKGROUND AND SUMMARY OF THE INVENTION

Typical driver-side air bag cushions are designed with internal tethers that stop the forward motion of the cushion at a specific distance during deployment. This reduces the amount of "bag slap" experienced by the driver when the air bag deploys and provides better steering wheel coverage. Some passenger-side air bags also include such internal tethers.

The air bag of the present invention as described herein applies particularly to cushions that are designed to provide coverage for both right-front and center occupants. In the case of an air bag without a tether, when deployed the center occupant's portion of the bag typically rotates toward the right-front passenger. This rotation induces poor occupant kinematics and can lead to excessive lateral occupant motion against a person located on the right hand side when there is no center occupant. In order to reduce this motion or rotation, an anchor is provided for the center occupant's portion of the bag. Preferably, the anchor comprises a short tether extending from the neck of the bag to the center occupant's portion of the bag. The tether is preferably on the outside of the bag because an external tether allows for a shorter radius and better control over air bag rotation thus, in addition to protecting a right side passenger from lateral forces, also preventing "bag slap" against a center occupant.

One object of this invention is to provide an air bag assembly having the foregoing features and capabilities.

Another object is to provide an air bag assembly which is composed of a relatively few simple parts, is rugged and durable in use, and can be readily manufactured and assembled.

These and other objects, features and advantages of the invention will become more apparent as the following description proceeds, especially when considered with the accompanying drawings.

DETAILED DESCRIPTION OF A PREFERRED EMBODIMENT

Figure 1:
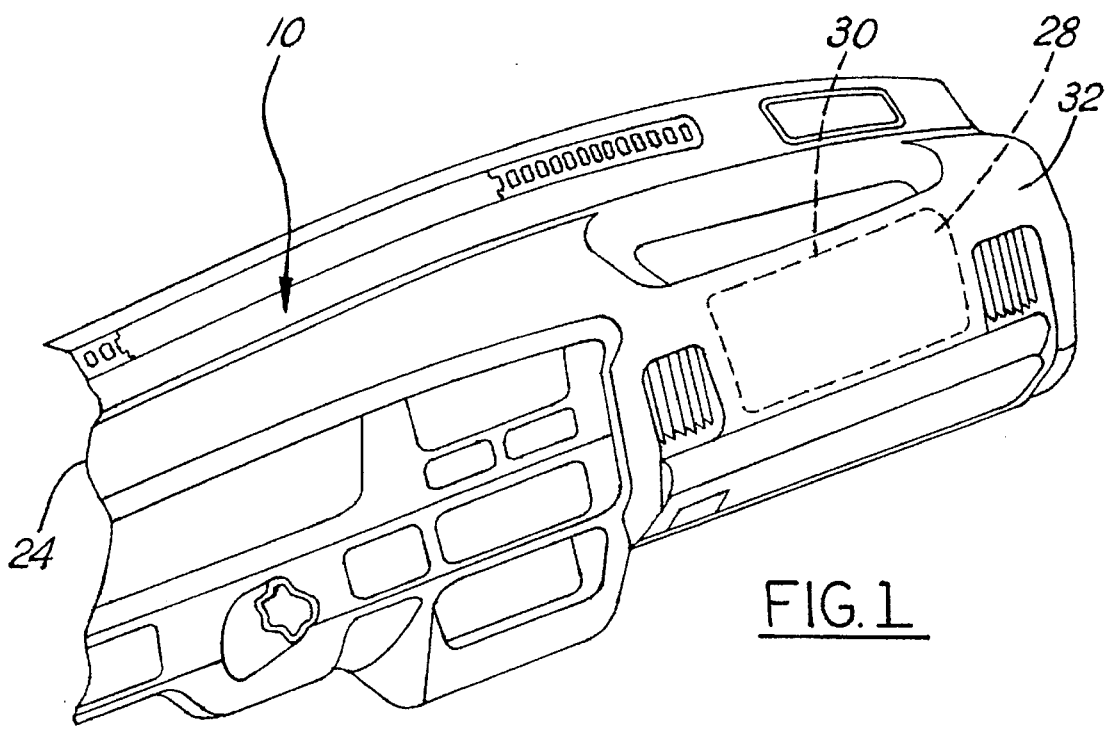
FIG. 1 is a fragmentary perspective view showing the instrument panel within an automotive vehicle as seen from the position of a person occupying the driver's seat, with the air bag assembly of this invention on the passenger side concealed by the instrument panel.
Figure 2:
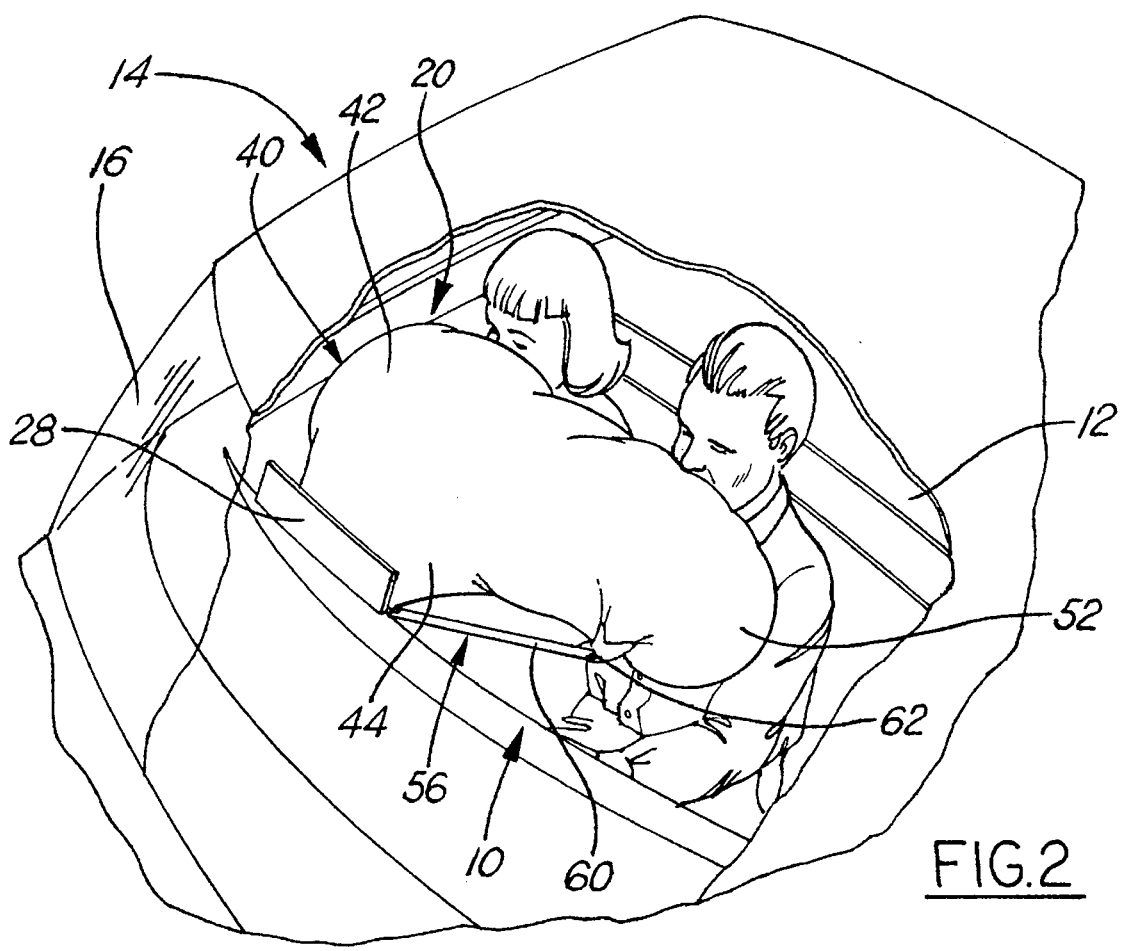
FIG. 2 is a perspective view looking down on a motor vehicle and with a portion of the roof of the vehicle broken away, showing the air bag inflated and deployed to provide a cushion protecting the right-front passenger and center passenger in the front seat of a motor vehicle.

Referring now more particularly to the drawings, an instrument panel 10 extends across the front of the passenger compartment 12 of an automotive vehicle 14 under the windshield 16. Mounted on the right side, that is, the passenger side, of the instrument panel is an air bag assembly 20.

The instrument panel 10 has a wall 24 formed with an opening 26 on the passenger side. A door 28, hinged to the instrument panel at 30, normally closes the opening 26. The door conceals the air bag assembly 20 which is mounted in front of the opening 26. The instrument panel 10, including door preferably is covered by a decorative layer 32 of vinyl or the like so that the outline of the door is not visible. This general construction is shown in U.S. Pat. No. 5,394,602 assigned to the assignee of this application.

The air bag assembly 20 comprises a canister or housing 34 having a wall or walls 36 formed with an opening 38 in the rear registering with the opening 26 in the instrument panel. An air bag 40 made of nylon or like material is normally stored in the housing 34 and is adapted when inflated to deploy through the opening 26 in the instrument panel, in the process forcing open the door 28.

The air bag 40 is of integral, one-piece construction and has a main sac portion 42 formed with a front neck 44 which is secured within the housing 34 by any suitable means such as by the fasteners 46. The neck is open at 48 within the housing and surrounds the inflater 50 which is of typical construction and is mounted within the housing 34 by any suitable means. The main sac portion 42 of the air bag has a lateral extension 52 which is in full communication with the main sac portion.

Figure 3:
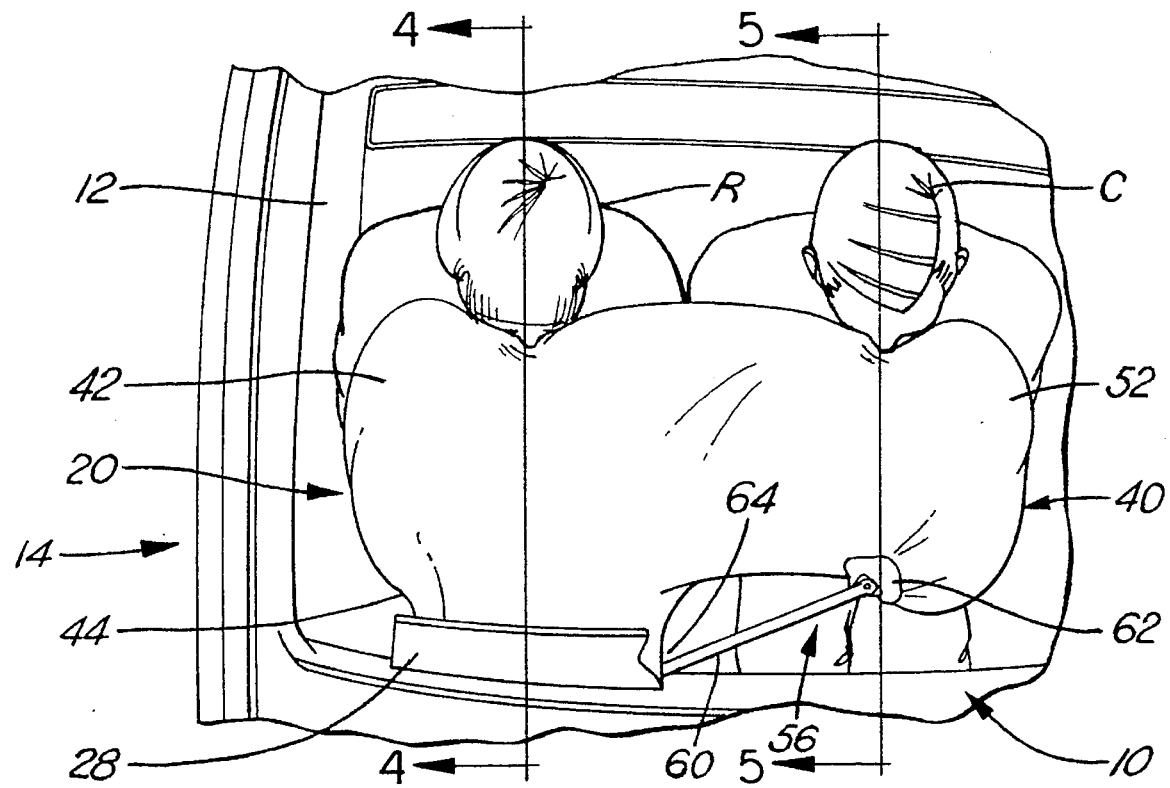
FIG. 3 is a top plan view showing the right-front passenger and center passenger being protected by the inflated air bag cushion.
Figure 4:
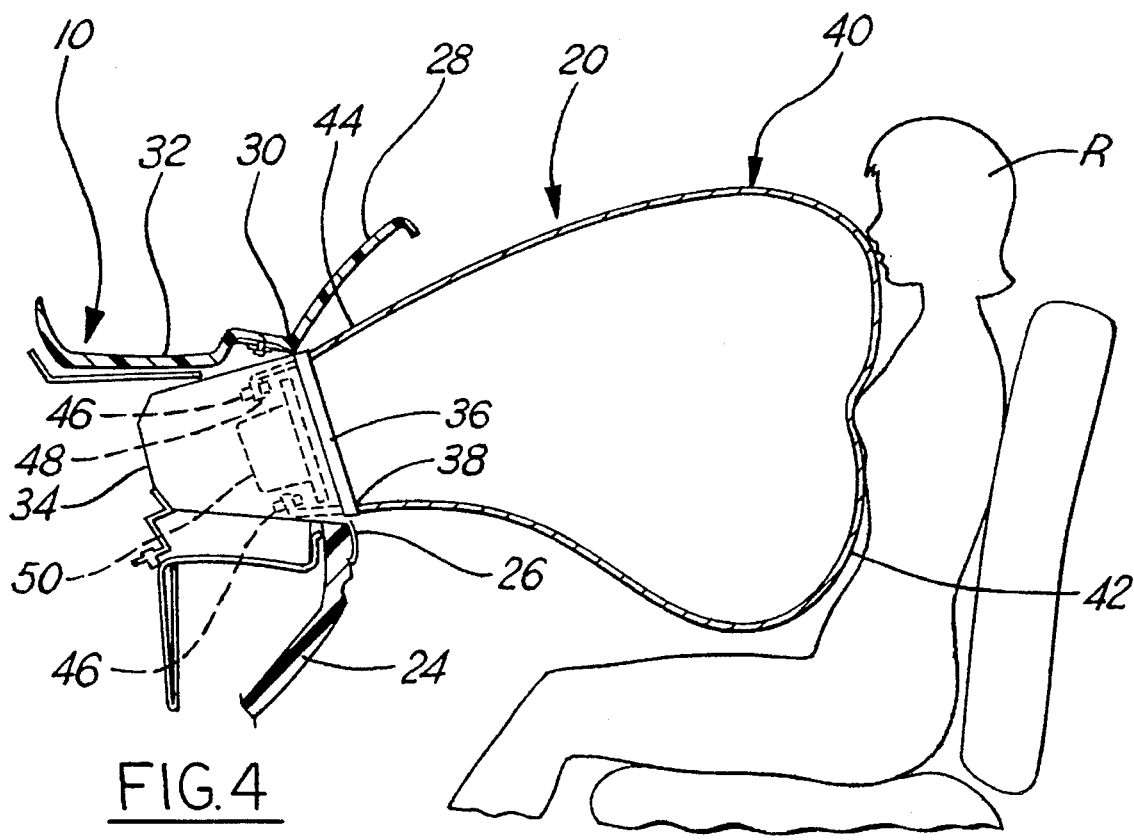
FIG. 4 is a sectional view taken on the line 4—4 in FIG. 3.
Figure 5:
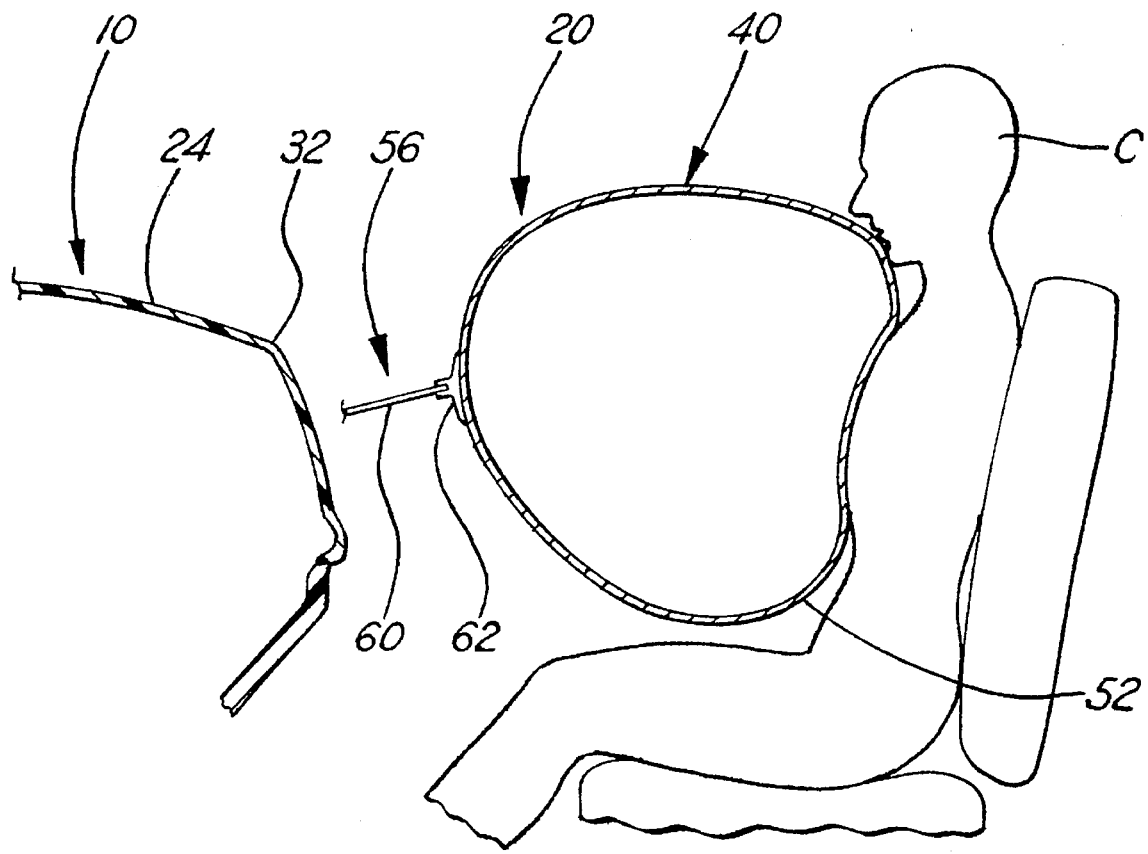
FIG. 5 is a sectional view taken on the line 5—5 in FIG. 3.

The air bag 40 is a closed receptacle for the gaseous medium which inflates the air bag, except for the opening 48 in the neck 44 through which the inflating medium enters the air bag. The air bag, when inflated, is generally kidney-shaped, or L-shaped, as best seen in FIG. 3. The main sac portion 42 of the air bag 40 is directly in front of the right front occupant R of the front seat of the vehicle and the lateral extension 52 is directly in front of the center occupant C. The main sac portion 42 and the lateral extension 52 provide a single broad cushion to protect both occupants R and C.

Figure 6:
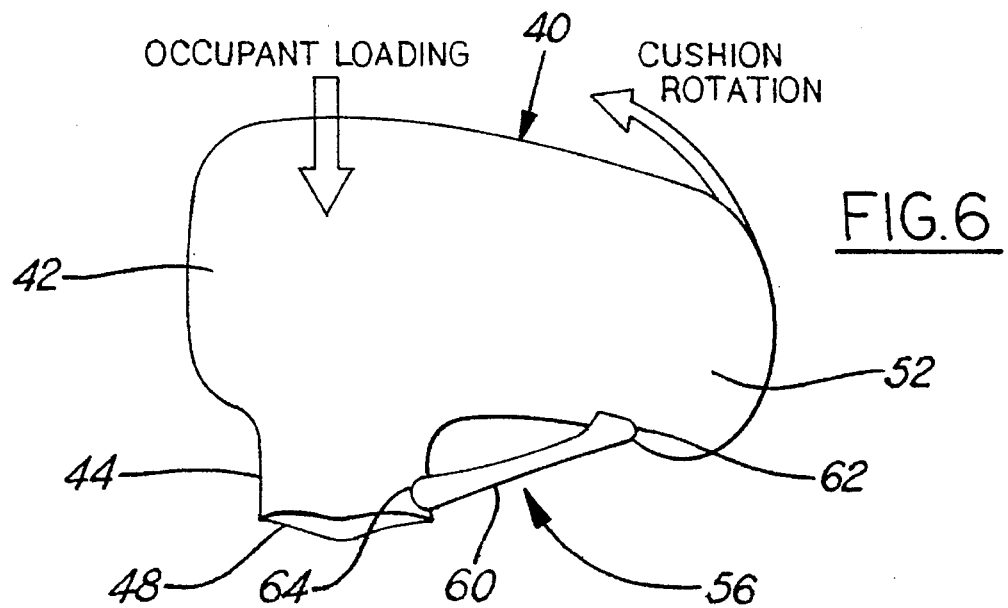
FIG. 6 is an elevational view of the inflated air bag.

As previously stated, when deployed the center occupant's portion of the air bag, which is the lateral extension 52, has a tendency to rotate toward the right front passenger (See FIG. 6). This rotation, unless restricted, can lead to excessive lateral occupant motion and is therefore undesirable. In order to reduce this rotation, an anchor 56 is provided. Anchor 56 is a tether 60 in the form of an elongated flexible liner member or cord. One end of the tether 60 is secured to the front wall of the lateral extension 52 as indicated at 62. The entire tether 60 is external to the air bag 40 and its opposite end is anchored at 64, preferably to the neck 44 of the air bag. It could alternately be connected to the air bag housing 34. When the air bag deploys, this relatively short tether 60 restricts the tendency of the air bag to rotate and causes whatever rotation there is to be controlled and on a short radius. Placing the tether inside the bag would be of some benefit but would require a longer radius and therefore less reduction in air bag rotation.

What is claimed is:

1. An air bag assembly for an automotive vehicle comprising a housing having a wall formed with an opening, an air bag stored in said housing and adapted when inflated to deploy through said opening, said air bag having a main sac portion and said main sac portion having a lateral extension, said lateral extension being in full communication with said main sac portion and when said air bag is inflated and deployed said lateral extension cooperating with said main sac portion in providing a broad cushion to protect two persons seated side by side in the vehicle rearwardly of the housing, and an anchor attached to said lateral extension for restricting air bag rotation when the air bag is inflated.

2. An air bag assembly as defined in claim 1, wherein said anchor comprises a tether connected to said lateral extension.

3. An air bag assembly as defined in claim 2, wherein said tether is external to said air bag and is in the form of an elongated, flexible linear member having one end thereof attached to said lateral extension.

4. An air bag assembly adapted to be mounted in the instrument panel of an automotive vehicle and comprising an air bag, a housing for said air bag having a wall formed with an opening, said air bag being stored in said housing and when inflated being adapted to deploy through said opening, said air bag when inflated being kidney-shaped having a main sac portion, said main sac portion being formed with a front neck connected to said housing and having a lateral extension, said lateral extension being in full communication with said main sac portion and when said air bag is inflated said lateral extension cooperating with said main sac portion in providing a broad cushion to protect the right front occupant and center front occupant in the vehicle rearwardly of the housing, and a tether which is entirely external to said air bag and attached to said lateral extension for restricting air bag rotation and excessive travel when the air bag is inflated.

5. An air bag assembly as defined in claim 4, wherein said tether is an elongated, flexible linear member having a first end connected to said lateral extension and a second end connected to said neck.

* * * * *